(12) United States Patent
Velikin et al.

(10) Patent No.: US 12,190,493 B1
(45) Date of Patent: Jan. 7, 2025

(54) APPARATUS AND SYSTEM FOR EDGE TUNING

(71) Applicants: Christo Velikin, Boston, MA (US); Vance Bakalov, Boston, MA (US)

(72) Inventors: Christo Velikin, Boston, MA (US); Vance Bakalov, Boston, MA (US)

( * ) Notice: Subject to any disclaimer, the term of this patent is extended or adjusted under 35 U.S.C. 154(b) by 0 days.

(21) Appl. No.: 18/595,099

(22) Filed: Mar. 4, 2024

(51) Int. Cl.
*G06T 7/00* (2017.01)
*A63C 11/00* (2006.01)
*G03B 17/56* (2021.01)

(52) U.S. Cl.
CPC .......... *G06T 7/0004* (2013.01); *G03B 17/561* (2013.01); *A63C 11/00* (2013.01); *G06T 2207/30136* (2013.01)

(58) Field of Classification Search
CPC ........ G06T 7/0004; G06T 2207/30136; G03B 17/561
See application file for complete search history.

(56) References Cited

U.S. PATENT DOCUMENTS

| 11,589,804 | B1 | 2/2023 | Choe | |
|---|---|---|---|---|
| 2011/0045742 | A1 | 2/2011 | Kildevaeld | |
| 2015/0047423 | A1* | 2/2015 | Brown | G01N 3/58 73/104 |
| 2015/0268038 | A1 | 9/2015 | Thorndike | |
| 2020/0016716 | A1* | 1/2020 | Layton, Jr. | B24B 3/003 |
| 2021/0162561 | A1* | 6/2021 | Chan | B23Q 17/0909 |

FOREIGN PATENT DOCUMENTS

| JP | S6260111 B2 * | 12/1987 | |
|---|---|---|---|
| WO | WO-2023201041 A1 * | 10/2023 | A63C 3/10 |

* cited by examiner

*Primary Examiner* — Ross Varndell
(74) *Attorney, Agent, or Firm* — Intellectual Strategies (57) ABSTRACT

An edge inspection apparatus includes a guide bracket and a camera mount. The guide bracket includes at least one contact surface and an abradant retainer. The contact surface makes contact with a corresponding surface of a target object and aids in positioning the guide bracket relative to an edge of the target object. The abradant retainer secures an abradant to the guide bracket and secures the abradant in a position relative to the edge of the target object. The camera mount secures a camera in a fixed position relative to the guide bracket and orients the camera lens toward the edge of the target object.

8 Claims, 7 Drawing Sheets

APPARATUS AND SYSTEM FOR EDGE TUNING

The subject matter of the present application has been developed in response to the present state of the art and, in particular, in response to the problems and disadvantages associated with conventional edge tuning devices and systems. Conventional edge tuning devices and systems have not yet fully resolved shortcomings related to imprecise edge tuning.

Across different industries, there are significant implications of imprecise edge tuning. For example, snow skis that are improperly tuned can result in decreased performance or even injury to the users. Other industries such as ice skating and even knife sharpening can be negatively affected by imprecise edge tuning. Accordingly, the subject matter of the present application has been developed to provide embodiments of an apparatus and system, as well as methods, which overcome at least some of the shortcomings of prior art techniques.

Embodiments disclosed and claimed herein improve the ability of users to achieve a higher level of precision and confidence when tuning the edge of an object such as a ski, skate, or knife. Although the advantages and benefits of specific embodiments might differ, at least some of the embodiments described here facilitate better visual inspection of an edge that is being, or has been, tuned, better precision in the level of sharpness or dullness purposefully achieved for a given edge tuning, and better use of edge profiles that might increase the repeatability of a precisely tuned edge.

One embodiment described herein is an edge inspection apparatus. In an embodiment, the edge inspection apparatus includes a guide bracket with at least one contact surface configured to make contact with a corresponding surface of a target object. The contact surface is further configured to aid in positioning the guide bracket relative to an edge of the target object. In an embodiment, the guide bracket also includes an abradant retainer configured to secure an abradant to the guide bracket. The abradant retainer is further configured to secure the abradant in a position relative to the edge of the target object. In an embodiment, the edge inspection apparatus also includes a camera mount coupled to the guide bracket. The camera mount is configured to secure a camera in a fixed position relative to the guide bracket. The camera mount is further configured to orient a camera lens of the camera toward the edge of the target object.

In a further embodiment, the edge inspection apparatus also includes the camera. In an embodiment, the camera includes the camera lens, a sensor, a digital processing module, a digital storage unit, and a computer program product. In an embodiment, the sensor is aligned with the camera lens and configured to produce electrical signals in response to exposure to incident light. In an embodiment, the digital processing module is coupled to the sensor and configured to digitally process signals output from the sensor to the digital processing module according to one or more processing algorithms. In an embodiment, the digital storage unit is coupled to the digital processing module and configured to store digital signals representative of the electrical signals produced in response to the exposure to the incident light.

In an embodiment, the computer program product is coupled to the digital processing module and includes at least one digital memory unit storing digital programming instructions that, when executed by the digital processing unit, are configured to implement a series of software functions. In an embodiment, the digital programming instructions include an input module, an image processing module, an image analysis module, a user feedback module, and an output module. In an embodiment, the input module is configured to process input signals received by the digital processing module. In an embodiment, the image processing module is configured to process the input signals to generate at least one image quality signal indicative of a image quality characteristic of the input signals. In an embodiment, the image analysis module is configured to process the input signals to determine an edge quality indicator descriptive of a portion of the edge of the target object. In an embodiment, the user feedback module is configured to generate a feedback signal from the digital processing module, in which the feedback signal is to a user interface. In one embodiment, the output module is configured to generate an output signal from the feedback signal and to further direct the output signal from the digital processing module to a user interface.

In a further embodiment, the image analysis module is further configured to assess an edge sharpness of the edge along a length of the edge of the target object. In a further embodiment, the image analysis module is further configured to generate an edge trendline descriptive of a continuity of the edge of the target object. In a further embodiment, the user feedback module is further configured to generate the feedback signal comprising a feedback indicator that, when output as part of the output signal, provides a visual indication to the user of a quality deviation from the edge trendline. In a further embodiment, the image analysis module is further configured to assess an edge sharpness of the edge along a length of the edge of the target object. In a further embodiment, the image analysis module is further configured to assess an edge sharpness of the edge along a length of the edge of the target object.

In a further embodiment, the edge inspection apparatus also includes an electrical power source and a light. In a further embodiment, the light is coupled to the electrical power source and configured, when illuminated, to increase illumination at the edge of the target object.

In a further embodiment, the edge inspection apparatus includes a plurality of mount connectors to physically couple the camera mount to the guide bracket. In a further embodiment, the guide bracket also includes a structure to define a viewing window, which is in alignment with both the camera lens and the edge of the target object. In a further embodiment, the edge inspection also includes an abradant mounted within the abradant retainer, and the abradant includes an abrasive surface and is positioned relative to the contact surface of the guide such that the abrasive surface is in contact with a corresponding surface adjacent to the edge when the contact surface is in contact with a face surface or a base surface of the target object.

Another embodiment described herein is an edge inspection system. In one embodiment, the edge inspection system includes a guide bracket, a camera, and an electronic processing device. In an embodiment, the guide bracket includes an abrasive surface for tuning a metal edge of a target object. In an embodiment, the camera is coupled to the guide bracket and disposed to capture an image of a portion of the metal edge. In an embodiment, the electronic processing device is coupled to the camera and configured to execute software instructions to evaluate characteristics of the metal edge before and after the tuning.

In a further embodiment, the edge inspection system also includes a light coupled to the guide bracket, and the light is disposed to illuminate the portion of the metal edge within a field of view of the camera. In a further embodiment, the electronic processing device is also configured to evaluate a sharpness characteristic of the metal edge. In a further embodiment, the electronic processing device is also configured to evaluate a sharpness trendline of the metal edge along a length of the metal edge. In a further embodiment, the electronic processing device is also configured to evaluate an angular characteristic of the metal edge. The angular characteristic is related to a relative angle between two surfaces interesting at the metal edge.

Another embodiment described here includes an edge inspection system. In an embodiment, the system includes a guide bracket, a camera mount, a camera, and a computer program product. In an embodiment, the guide bracket includes at least one contact surface and an abradant retainer. In an embodiment, the contact surface is configured to make contact with a corresponding surface of a target object and configured to aid in positioning the guide bracket relative to an edge of the target object. In an embodiment, the abradant retainer is configured to secure an abradant to the guide bracket and is also configured to secure the abradant in a position relative to the edge of the target object.

In one embodiment, the camera mount is coupled to the guide bracket and the camera is disposed within the camera mount to orient a camera lens of the camera toward the edge of the target object.

In an embodiment, the computer program product is coupled to the camera and includes at least one digital memory unit storing digital programming instructions that, when executed by a digital processing unit, are configured to implement as series of software functions. In an embodiment, the digital programming instructions include an input module, an image processing module, an image analysis module, a user feedback module, and an output module. In an embodiment, the input module is configured to process input signals received by the digital processing module. In an embodiment, the image processing module is configured to process the input signals to generate at least one image quality signal indicative of a image quality characteristic of the input signals. In an embodiment, the image analysis module is configured to process the input signals to determine an edge quality indicator descriptive of a portion of the edge of the target object. In an embodiment, the user feedback module is configured to generate a feedback signal from the digital processing module and to send the feedback signal to a user interface. In an embodiment, the output module is configured to generate an output signal from the feedback signal and to further direct the output signal from the digital processing module to a user interface.

In a further embodiment, the image analysis module is further configured to assess an edge sharpness of the edge along a length of the edge of the target object. In a further embodiment, the image analysis module is further configured to generate an edge trendline descriptive of a continuity of the edge of the target object. In a further embodiment, the image analysis module is further configured to assess an edge sharpness of the edge along a length of the edge of the target object.

Other aspects and advantages of embodiments of the present invention will become apparent from the following detailed description, taken in conjunction with the accompanying drawings, illustrated by way of example of the principles of the invention.

In order that the advantages of the subject matter may be more readily understood, a more particular description of the subject matter briefly described above will be rendered by reference to specific embodiments that are illustrated in the appended drawings. Understanding that these drawings depict only certain embodiments of the subject matter and are not therefore to be considered limiting of its scope, the subject matter will be described and explained with additional specificity and detail through the use of the drawings.

Throughout the description, similar reference numbers may be used to identify similar elements. The following list is an example of the reference numbers used in the accompanying drawings.

| Reference # | Element |
| --- | --- |
| 100 | Edge Inspection Apparatus |
| 102 | Guide bracket |
| 104 | Guide contact surface |
| 106 | Abradant retainer |
| 108 | Guide window |
| 110 | Camera mount |
| 112 | Mount connectors (fixed or adjustable) |
| 114 | Abradant |
| 116 | Abrasive surface |
| 152 | Implement |
| 154 | Edge Material |
| 156 | Camera Field of View (FOV) |
| 200 | Computing System |
| 14 | Processing Unit |
| 16 | Bus |
| 18 | I/O Interface(s) |
| 20 | Network Adaptor(s) |
| 22 | Memory |
| 24 | RAM |
| 26 | Cache Memory |
| 28 | Storage Media |
| 60 | Network |
| 300 | Computer Program Product |
| 302 | Input module |
| 304 | Output module |
| 306 | Image processing module |
| 308 | Image analysis module |
| 310 | User feedback module |

Throughout this application, similar designations or vocabulary may be used to identify similar elements, although the breadth of this disclosure should be understood to incorporate any alternatives and variations referenced within the specification (including the claims) and the accompanying drawings.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments describe a computer-implemented method. Other embodiments describe a computer system with one or more processors and memory including instructions which, when accessed by the one or more processors, cause the one or more processors to perform functions described herein. Other embodiments describe a computer system including a core engine which includes one or more processors and is configured to perform functions described herein.

Figure 1:
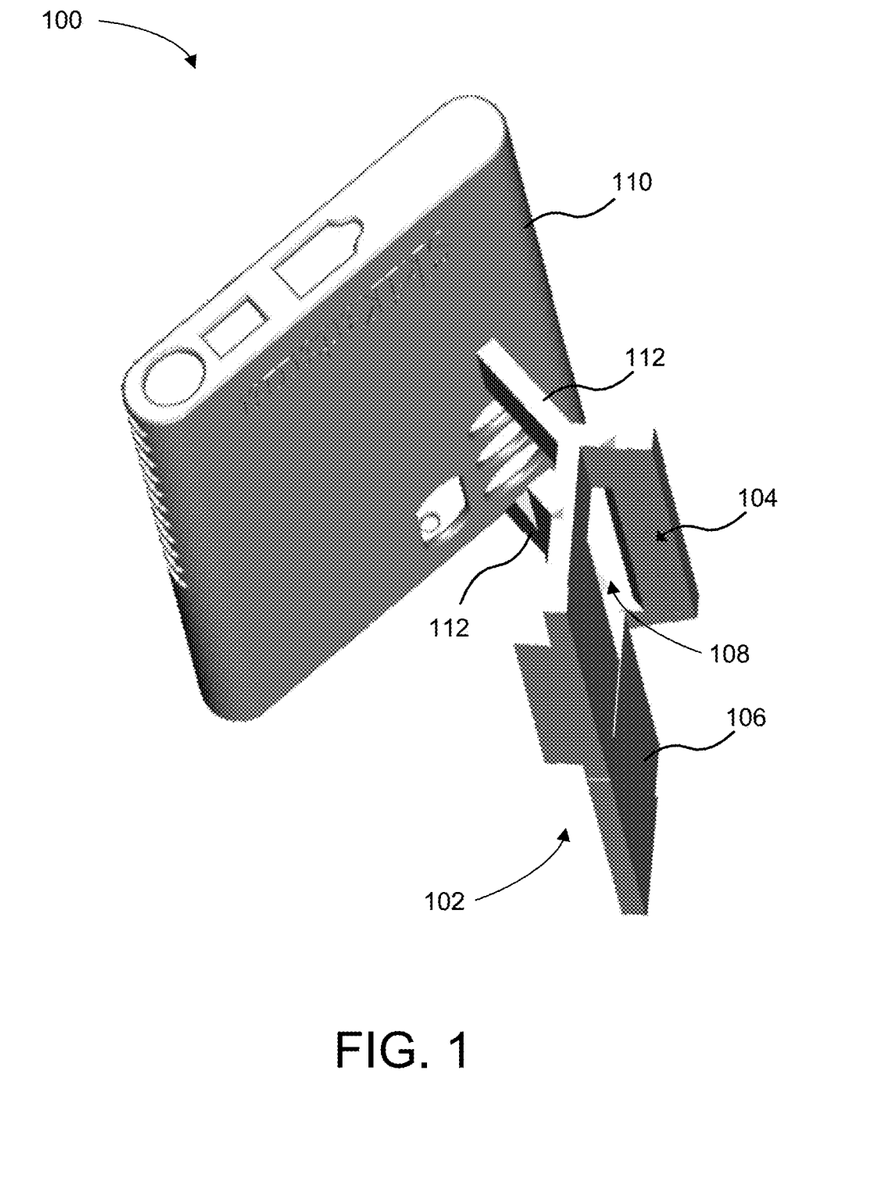
FIG. 1 depicts a perspective view of one embodiment of an edge tuning apparatus according to one or more embodiments of the present disclosure.

FIG. 1 depicts a perspective view of one embodiment of an edge tuning apparatus 100 according to one or more embodiments of the present disclosure. In general, the edge tuning apparatus 100 is configured to facilitate a user sharpening the edge of an object. In some examples, the edge tuning apparatus 100 is useful for a user sharpening the edge of a ski or snowboard. In other examples, embodiments of the edge tuning apparatus 100 may be used in sharpening knives, skate blades, or other objects with edges where sharpness contributes to the functionality of the objects.

In the illustrated embodiment, the edge inspection apparatus 100 includes a guide bracket 102. Overall, the guide bracket 102 facilitates guiding the edge tuning apparatus 100 along the edge of the object during the sharpening actions. The illustrated guide bracket 102 includes a guide contact surface 104, an abradant retainer 106, and a guide window 108. Additionally, the guide bracket may include any form of handles, grips, protrusions, or other features that facilitate a user handling the guide bracket 102.

In one embodiment, the guide contact surface 104 is configured to allow a surface of the edge (or of the object) to slide against the guide contact surface 104 during an edge tuning action. Although the depicted surface has a specific geometry, other embodiments may have different geometries, shapes, sizes, and/or discontinuities.

In one embodiment, the abradant retainer 106 provides a dedicated place for an abradant 114 (i.e., an abrasive block or material, refer to FIG. 2) to be mounted to and retained on the guide bracket 102. The abradant retainer 106 holds the abradant 114 in a fixed position as the guide bracket 102 is moved along the edge of the object. In some embodiments, the guide bracket 102 is formed to create a specific, fixed angle between the guide contact surface 104 and an abrasive surface 116 (refer to FIG. 2) of the abradant 114. That angle may vary, depending on the application and the type of edge to be tuned.

Figure 2:
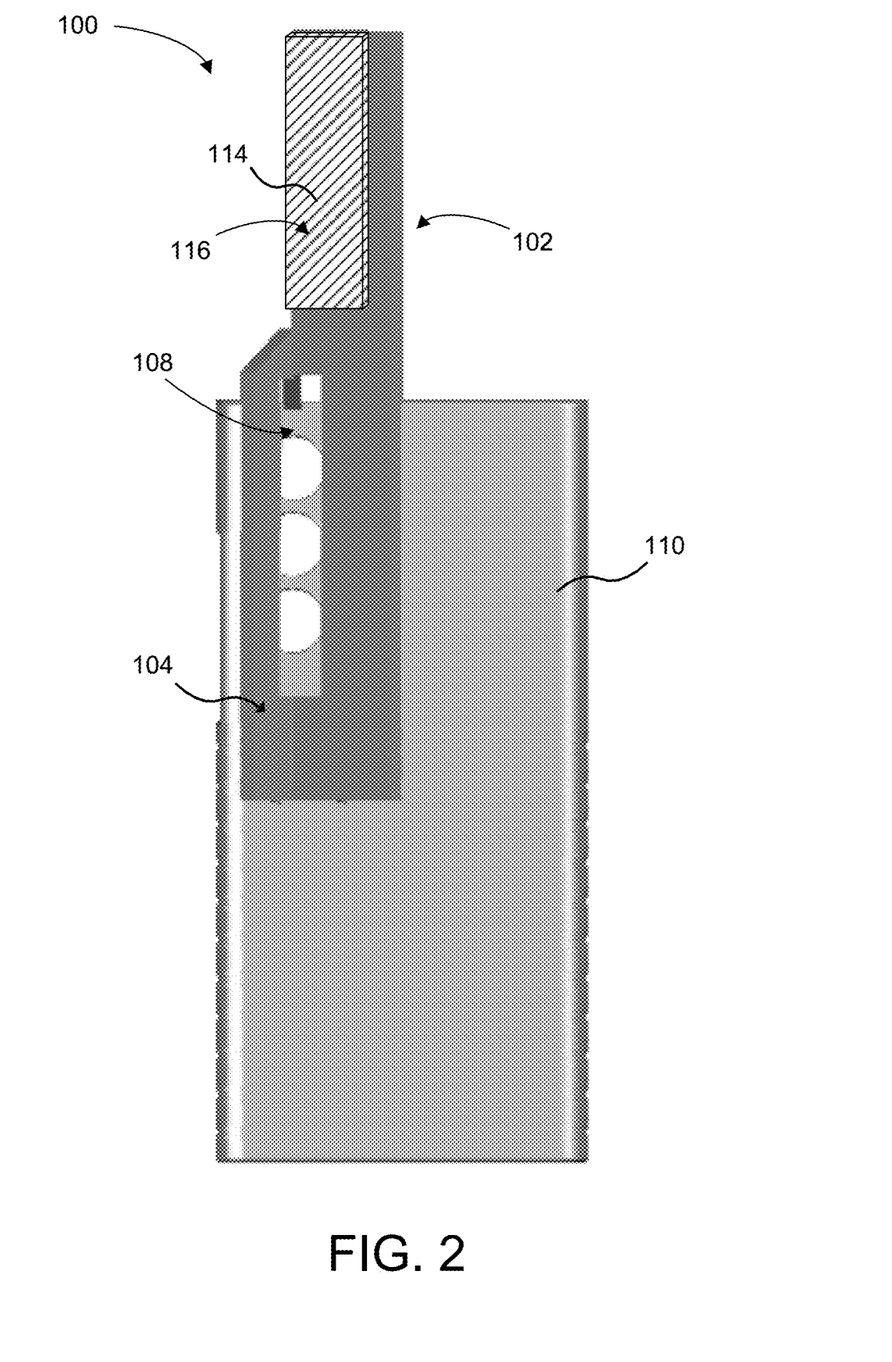
FIG. 2 depicts another view of the edge tuning apparatus of FIG. 1.

In other embodiments, the guide bracket 102 may include functionality to facilitate adjustment of the angle between the guide contact surface 104 and the abrasive surface 116 of the abradant 114. For example, the guide bracket may include hinges, clamps, locks, or other mechanisms to allow either the guide contact surface 104 or the abradant retainer 106 (or both) to be adjusted relative to other fixed components of the guide bracket 102.

In one embodiment, the guide window 108 is formed in alignment relative to the guide contact surface 104 and the abradant retainer 106 so that the guide window 108 provides a view of a portion of the edge that is being tuned, at a point that is at, adjacent to, or near the point of tuning. In some embodiments, the guide window 108 is fully circumscribed by other structural parts of the guide bracket 102. In other embodiments, the guide window 108 may be only partially circumscribed by component parts of the guide bracket 102, so long as the remaining structural components of the guide bracket 102 provide sufficient structural integrity to perform the other functions described herein. Additionally, although the guide window 108 is shown with a specific configuration, other embodiments of the guide window 108 may have different geometries, shapes, sizes, and/or discontinuities.

In the illustrated embodiment, the edge inspection apparatus 100 also includes a camera mount 110. In some embodiments, the camera mount 110 is configured to secure an electronic device having camera functionality. The electronic device may be a dedicated digital camera. In other embodiments, the electronic device may be a phone or other personal digital device that has camera functionality built into it. In further embodiments, the camera mount 110 may be customized to a specific type of electronic device, or the camera mount 110 may be adjustable to accommodate a variety of different shapes or sizes of electronic devices.

In further embodiments, the camera mount 110 may include one or more camera windows aligned with one or more camera(s) within the electronic device. Each camera window may be sized in accordance with a specific camera lens or may be larger than the size of a single camera lens. In any case, the camera mount 110 is configured to orient the camera(s) of the electronic device toward the guide window 108 of the guide bracket 110. This allows the camera(s) to obtain images of the edge before, during, and after the tuning process.

In the illustrated embodiment, the edge inspection apparatus 100 also includes mount connectors 112. Although the illustrated embodiment shows two mount connectors 112, other embodiments may include fewer or more mount connectors 112. The mount connectors 112 are configured to secure the camera mount 110 to the guide bracket 102. In some embodiments, the mount connectors 112 are permanently connected to both the camera mount 110 and the guide bracket 102. In other embodiments, the mount connectors 112 may be adjustable relative to, or even detachable from, either the camera mount 110 or the guide bracket 102, or both.

FIG. 2 depicts another view of the edge tuning apparatus 100 of FIG. 1. In this view, the guide bracket 102 is in the near view, and the camera mount 110 is in the farther view.

In the illustrated view, the guide contact surface 104 and the guide window 108 of the guide bracket 102 are readily apparent. At the location of the abradant retainer 106, the illustrated embodiment includes an abradant 114 secured to the guide bracket 102. The abradant 114 has an abrasive surface 116 that orients toward the edge of an object during an edge tuning process.

In the illustrated view, it's also apparent that multiple camera windows of the camera mount 110 are aligned with the guide window 108 of the guide bracket 102. As noted above, alignment of the camera windows of the camera mount 110 (and, ultimately, the camera(s) of the electronic device) facilitates a user obtaining images, either recorded or real-time, of the edge during the edge tuning process.

Figure 3:
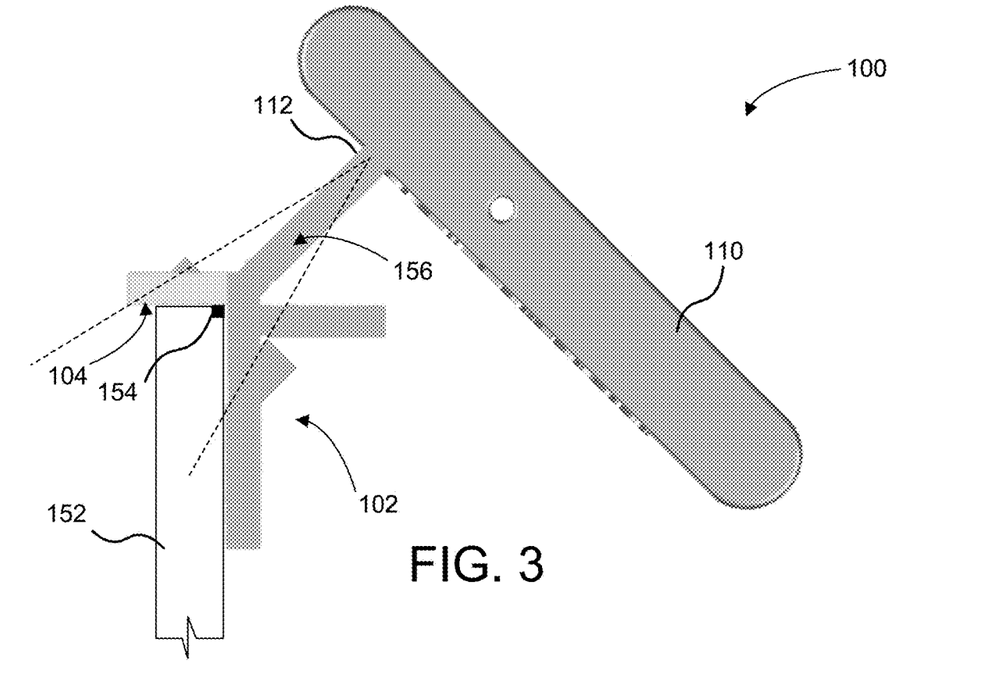
FIG. 3 depicts another view of the edge tuning apparatus of FIG. 1.

FIG. 3 depicts another view of the edge tuning apparatus 100 of FIG. 1. In this view, one end of each of the guide bracket 102 and the camera mount 110 is in view. Additionally, the illustrated embodiment depicts the guide bracket 102 in alignment with an object 152 having an edge 154. In the illustrated view, one end surface of the object 152 is adjacent to or in contact with the guide contact surface 104, and another surface of the object 152 is adjacent to or in contact with the counter-positioned structural components of the guide bracket, which includes (although not specifically designated in this figure) the abradant 114 positioned within the abradant retainer 106.

The illustrated view also emphasizes the alignment between the camera mount 110 and the guide window 108 which (although not designated) would encompass at least a portion of the edge 154 of the object 152. Specifically, a hypothetical field of view 156 of a camera within an electronic device mounted within the camera mount 110 is shown to illustrate that the field of view 156 provides coverage of at least a portion of the edge 154 (through the guide window 108) of the object 152.

Figure 4:
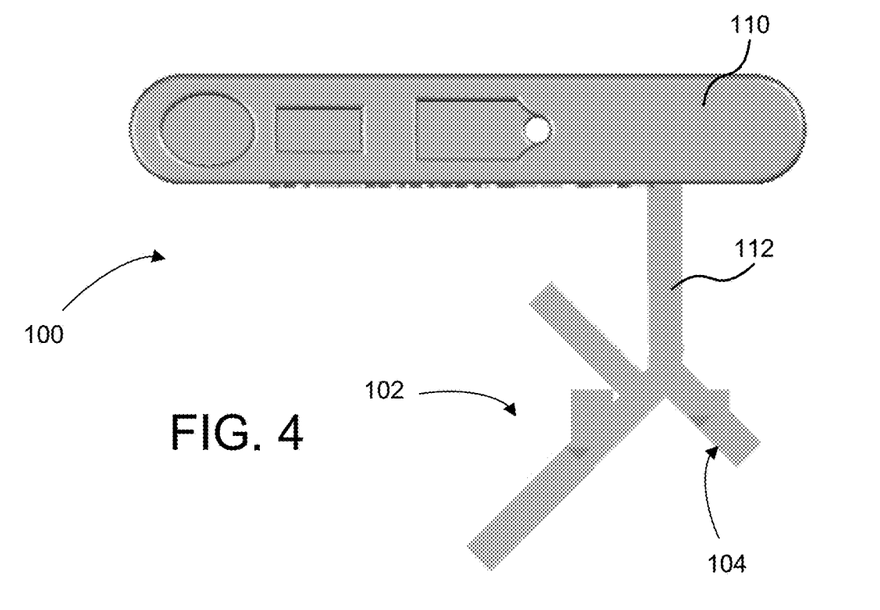
FIG. 4 depicts another view of the edge tuning apparatus of FIG. 1.

FIG. 4 depicts another view of the edge tuning apparatus 100 of FIG. 1. In this view, another end of each of the guide bracket 102 and the camera mount 110 is in view. The depicted edge tuning apparatus 100 includes the guide bracket 102 with the guide contact surface 104, the camera mount 100, and the mount connectors 112. Additionally, the illustrated embodiment depicts the guide bracket 102 in alignment with an object 152 having an edge 154.

Figure 5:
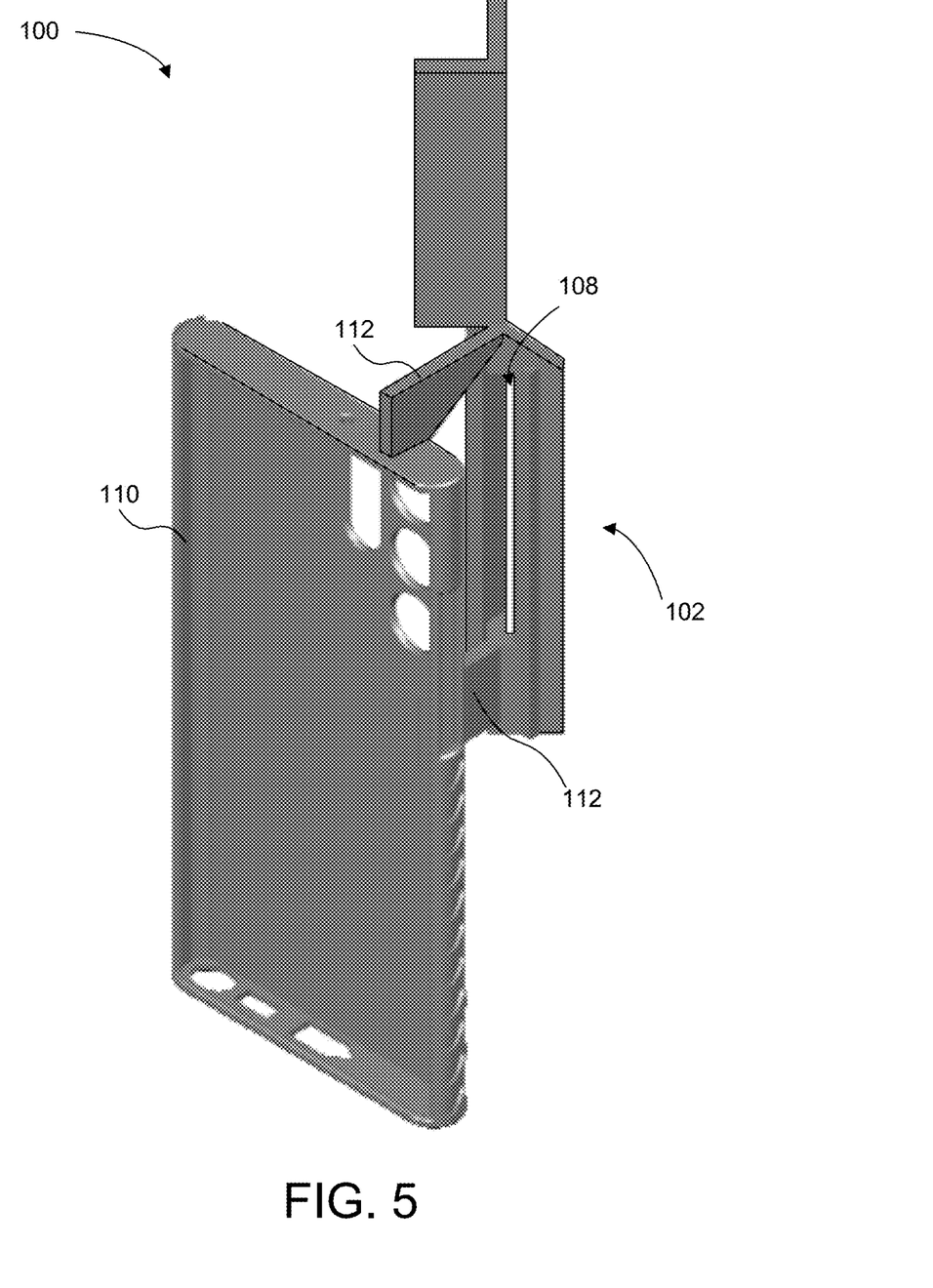
FIG. 5 depicts another view of the edge tuning apparatus of FIG. 1.

FIG. 5 depicts another view of the edge tuning apparatus 100 of FIG. 1. In this view, the guide bracket 102 is in the far view, and the camera mount 110 is in the near view. The depicted view specifically shows embodiments of the camera mount 110, the mount connectors 112, and the guide bracket 102. A partial view of the guide window 108 is also shown. Although this embodiment shows a specific implementation for each of these component parts, in other embodiments, each of these component parts may have different geometries, shapes, sizes, connections, and/or discontinuities.

Figure 6:
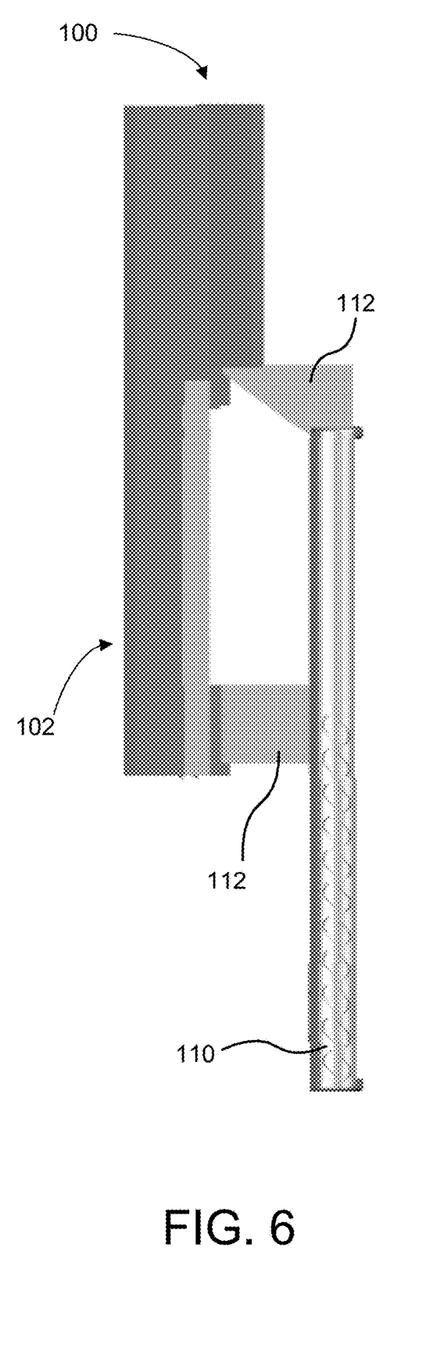
FIG. 6 depicts another view of the edge tuning apparatus of FIG. 1.

FIG. 6 depicts another view of the edge tuning apparatus 100 of FIG. 1. In this view, one side of each of the guide bracket 102, the camera mount 110, and the mount connectors 112 is in view. Although the illustrated embodiment shows a specific orientation of the camera mount 110 to the guide bracket 102, other embodiments may facilitate other mounting orientations.

As one example, the illustrated embodiment shows the camera mount 110 orienting basically directly toward the guide window 108 for a specific view of the edge (e.g., an approximately 45-degree view of the edge). In other embodiments, the camera mount 110 may be oriented so that the camera is shifted from one side to the other relative to the edge line. In other embodiments, the camera mount 110 may be oriented relative to the guide bracket 102 so that the field of view 156 of the camera is shifted toward another angle relative to the surfaces that form the edge.

Figure 7:
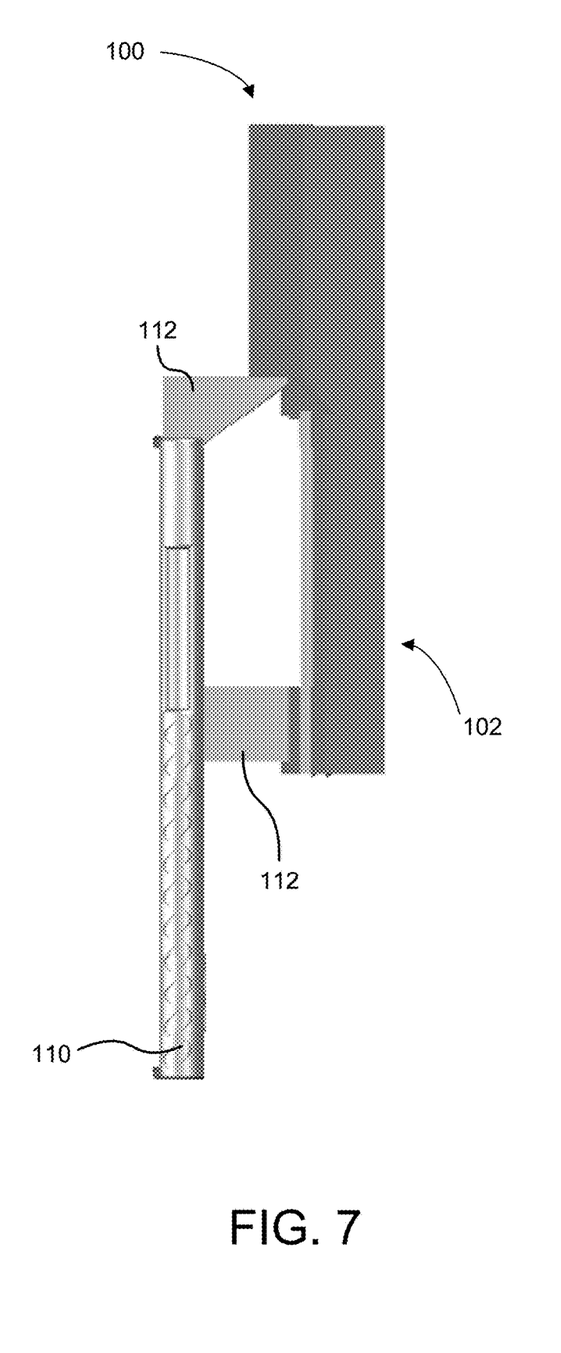
FIG. 7 depicts another view of the edge tuning apparatus of FIG. 1.

FIG. 7 depicts another view of the edge tuning apparatus 100 of FIG. 1. In this view, another side of each of the guide bracket 102, the camera mount 110, and the mount connectors 112 is in view.

Figure 8:
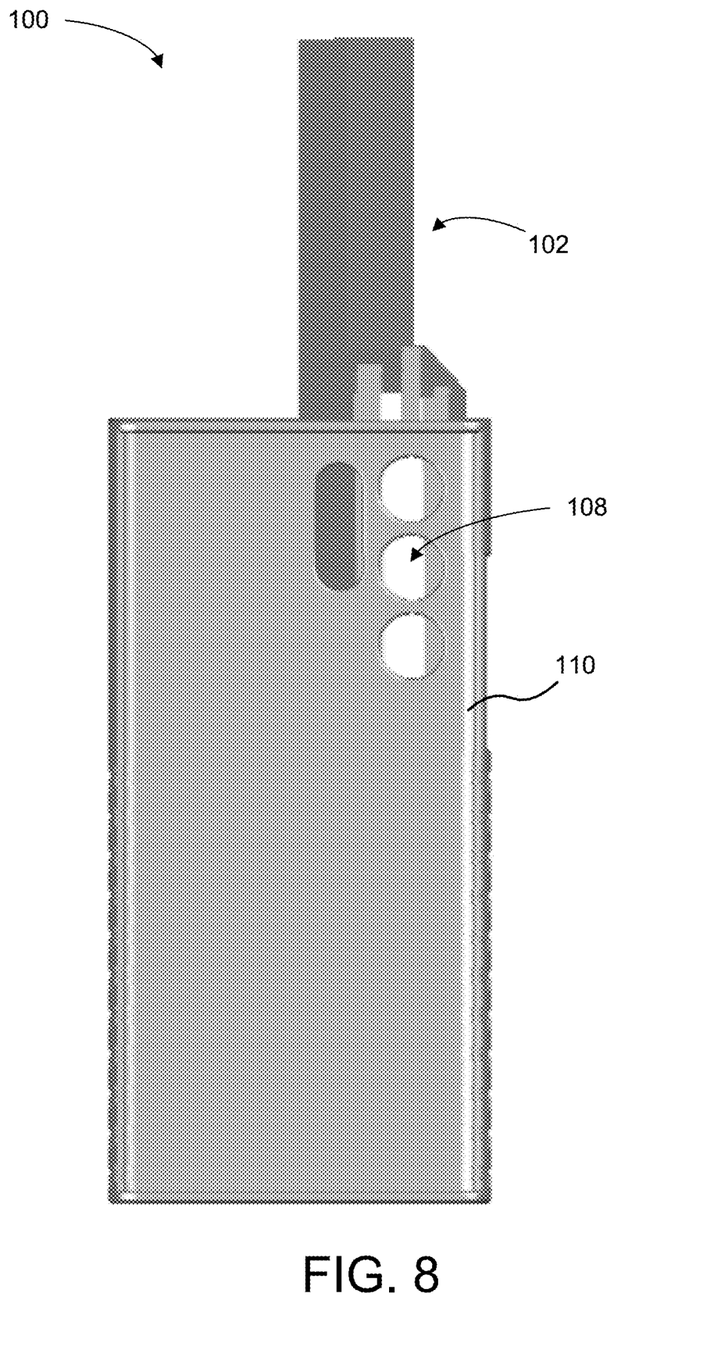
FIG. 8 depicts another view of the edge tuning apparatus of FIG. 1.

FIG. 8 depicts another view of the edge tuning apparatus 100 of FIG. 1. In this view, the guide bracket 102 with the guide window 108 is in the far view, and the camera mount 110 is in the near view.

Figure 9:
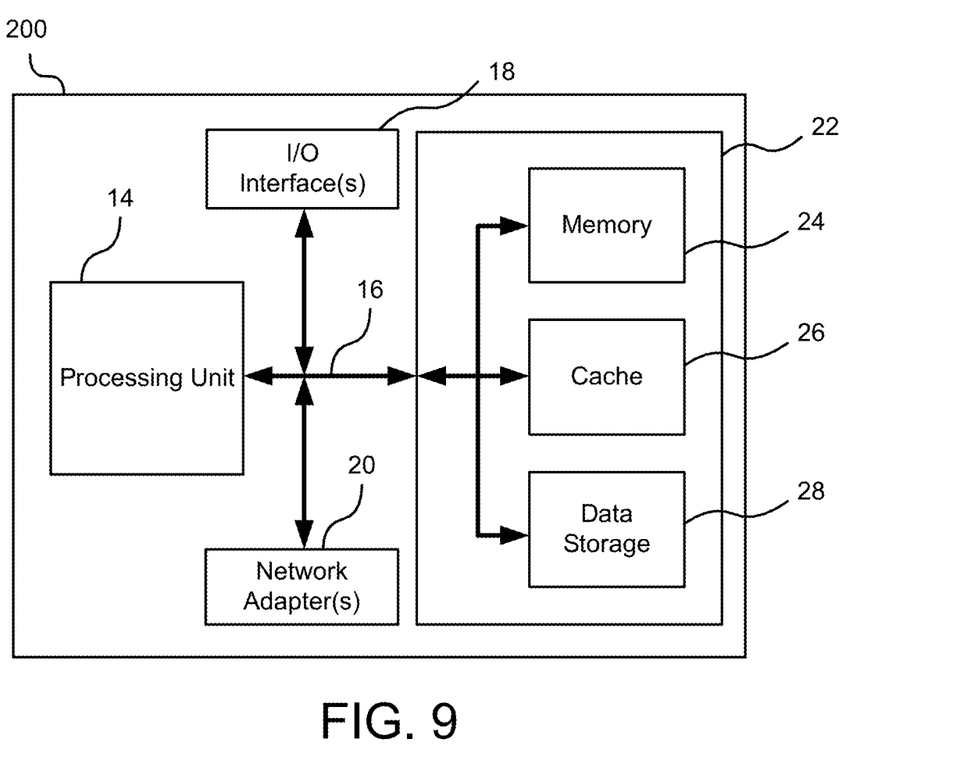
FIG. 9 depicts a schematic diagram of one embodiment of a @ according to one or more embodiments of the present disclosure.

FIG. 9 depicts a schematic diagram of one embodiment of a computing system 200 according to one or more embodiments of the present disclosure. Although the computing system 200 is shown and described with certain components and functionality, other embodiments of the computing system 200 may include fewer or more components to implement less or more functionality.

In some embodiments, aspects of the computing system 200 are implemented via a networked system or a computer system or its component parts. In general, the computing system 200 may be implemented in any type of electronic device. For example, the computing system 200 may be implemented within a smart phone that is mounted in the camera mount 110 and used with the edge tuning system 100. In other embodiments, the computing system 200 may be incorporated into a digital camera or another type of electronic device.

The illustrated computing system 200 may include, but is not limited to, one or more processing arrangements, for example including processors or processing units 14, a communication bus 16, one or more input/output (I/O) adapters 18, one or more network adapters 20, and a system memory 22.

In one embodiment, the system memory 22 includes computer system readable media in the form of volatile memory, such as random-access memory (RAM) 24 and/or cache memory 26. The system memory 22 may further include other removable/non-removable, volatile/non-volatile computer system storage media 28. In such instances, each type of memory or storage may be connected to the bus 16 by one or more data media interfaces.

In some embodiments, the memory 22 includes at least one program product having a set (e.g., at least one) of program modules that are configured to carry out the functions of proposed embodiments. For instance, the memory 22 may include a computer program product having program executable by the processing unit 14 to perform processes described herein. Programs and/or utilities having a set (at least one) of program modules may be stored in the memory 22. Program modules generally carry out the functions and/or methodologies described herein.

The computer system 200 also may communicate with one or more external devices such as a keyboard, a display, sensors, cameras, apps, or other external devices via the I/O interface 18. Also, the computer system 200 may communicate with one or more networks such as a local area network (LAN), a general wide area network (WAN), and/or a public network (e.g., the Internet) via the network adapter 20.

In the context of the present application, embodiments of the present invention constitute functional modules of a computer-implemented method. In other words, some or all of the functions of the method(s) described herein may be implemented as a process for execution by a computer, i.e., a computer-implemented method. The steps of the method therefore reflect various parts of a computer program, e.g., parts of one or more algorithms. Embodiments of the present invention may be a system, a method, and/or a computer program product. The computer program product may include a computer readable storage medium (or media) having computer readable program instructions thereon for causing a processor to carry out aspects of the present invention.

Figure 10:
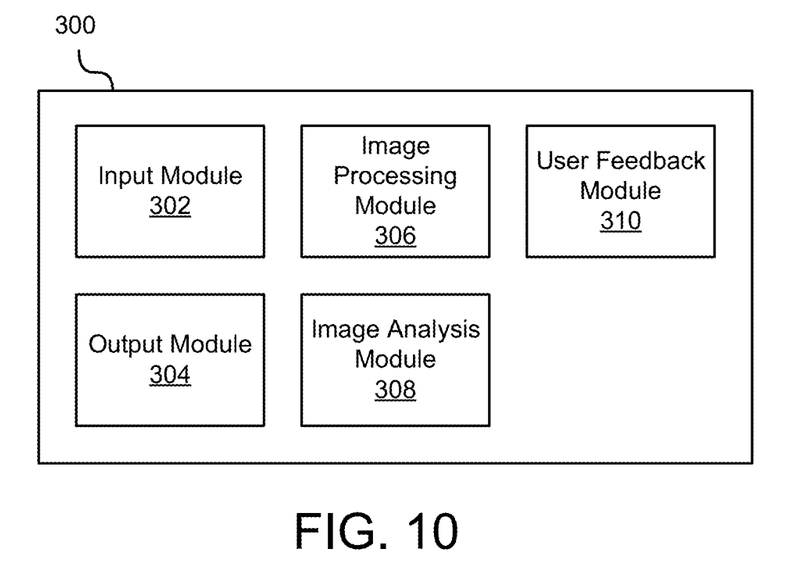
FIG. 10 depicts a schematic diagram of one embodiment of a computer program product according to one or more embodiments of the present disclosure.

FIG. 10 depicts a schematic diagram of one embodiment of a computer program product 300 according to one or more embodiments of the present disclosure. The illustrated computer program product 300 is depicted including functional modules that, when processed on an processor or the processing unit 14 of the computing device 200, cause a computer-implemented method to occur.

In the illustrated embodiment, the computer program product 300 includes an input module 302, an output module 304, an image processing module 306, an image analysis module 308, and a user feedback module 310. Although specific modules are shown and described with reference to this figure, other embodiments of the computer program product 300 may be implemented with fewer or more modules and/or functionality.

In one embodiment, the input module 302 is configured to process input signals received by the digital processing module.

In one embodiment, the image processing module 306 is configured to process the input signals to generate at least one image quality signal indicative of a image quality characteristic of the input signals.

In one embodiment, the image analysis module 308 is configured to process the input signals to determine an edge quality indicator descriptive of a portion of the edge of the target object.

In one embodiment, the user feedback module 310 is configured to generate a feedback signal from the digital processing module, in which the feedback signal is to a user interface.

In one embodiment, the output module 304 is configured to generate an output signal from the feedback signal and to further direct the output signal from the digital processing module to a user interface.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An edge inspection apparatus for skis, the apparatus comprising:
  a guide bracket configured to align a ski and an abradant, the guide bracket comprising:
    a guide contact surface, wherein the guide contact surface is flat;
    an abradant retainer orthogonal to the guide contact surface such that the guide bracket is configured to move along a ski with the ski contacting the guide contact surface and the abradant retainer;
    a guide window comprising an opening between the guide contact surface and the abradant retainer
    at least one contact surface configured to make contact with a corresponding surface of a target object, wherein the target object is a ski, wherein the at least one contact surface is further configured to aid in positioning the guide bracket relative to an edge of the target object; and
    an abradant retainer configured to secure an abradant to the guide bracket, wherein the abradant retainer is further configured to secure the abradant in a position relative to the edge of the target object; and
  a camera mount coupled to the guide bracket, where the camera mount is configured to secure a camera in a fixed position relative to the guide bracket and is further configured to orient a camera lens of the camera toward the edge of the target object;
  a camera wherein the camera comprises:
    the camera lens;
    a sensor aligned with the camera lens, where the sensor is configured to produce electrical signals in response to exposure to incident light;
    a digital processing module coupled to the sensor, wherein the digital processing module is configured to digitally process signals output from the sensor to the digital processing module according to one or more processing algorithms;
    a digital storage unit coupled to the digital processing module, wherein the digital storage unit is configured to store digital signals representative of the electrical signals produced in response to the exposure to the incident light; and
    a computer program product coupled to the digital processing module, wherein the computer program product comprises at least one digital memory unit storing digital programming instructions that, when executed by the digital processing unit, are configured to implement as series of software functions, wherein the digital programming instructions comprise:
      an input module configured to process input signals received by the digital processing module;
      an image processing module configured to process the input signals to generate at least one image quality signal indicative of a image quality characteristic of the input signals;
      an image analysis module configured to process the input signals to determine an edge quality indicator descriptive of a portion of the edge of the ski;
      a user feedback module configured to generate a feedback signal from the digital processing module, wherein the user feedback module is further configured to send feedback signal to a user interface; and
      an output module configured to generate an output signal from the feedback signal and to further direct the output signal from the digital processing module to a user interface; and
      wherein the image analysis module is further configured to generate an edge trendline descriptive of a continuity of the edge of the ski.

2. The edge inspection apparatus of claim 1, wherein the image analysis module is further configured to assess an edge sharpness of the edge along a length of the edge of the target object.

3. The edge inspection apparatus of claim 2, wherein the user feedback module is further configured to generate the feedback signal comprising a feedback indicator that, when output as part of the output signal, provides a visual indication to the user of a quality deviation from the edge trendline.

4. The edge inspection apparatus of claim 1, wherein the image analysis module is further configured to assess an edge sharpness of the edge along a length of the edge of the target object.

5. The edge inspection apparatus of claim 1, further comprising:
  an electrical power source; and
  a light coupled to the electrical power source, where the light is configured, when illuminated, to increase illumination at the edge of the target object.

6. The edge inspection apparatus of claim 1, further comprising a plurality of mount connectors to physically couple the camera mount to the guide bracket.

7. The edge inspection apparatus of claim 1, wherein the guide bracket further comprises a structure to define a viewing window, wherein the viewing window is in alignment with both the camera lens and the edge of the target object.

8. The edge inspection apparatus of claim 1, further comprising an abradant mounted within the abradant retainer, wherein the abradant comprises an abrasive surface and is positioned relative to the at least one contact surface of the guide bracket such that the abrasive surface is in contact with a corresponding surface adjacent to the edge when the at least one contact surface is in contact with a face surface or a base surface of the target object.

* * * * *